United States Patent [19]
Tran et al.

[11] Patent Number: 6,049,713
[45] Date of Patent: Apr. 11, 2000

[54] SYSTEM AND METHOD OF PROVIDING CALLING-LINE IDENTIFICATION (CLI) INFORMATION TO A MOBILE TERMINAL IN A RADIO TELECOMMUNICATIONS NETWORK

[75] Inventors: Hung Tran, Town of Mount Royal; Donald Joong, Montreal, both of Canada

[73] Assignee: Telefonaktiebolaget LM Ericsson (publ), Stockholm, Sweden

[21] Appl. No.: 08/947,207

[22] Filed: Oct. 8, 1997

[51] Int. Cl.[7] .............................. H04Q 7/20; H04Q 7/22; H04Q 7/38
[52] U.S. Cl. ........................ 455/415; 455/412; 455/403; 455/445; 455/414; 379/142; 379/245; 379/127; 379/247
[58] Field of Search .................................. 455/415, 403, 455/412, 413, 445, 462, 406, 567, 550, 553, 414; 379/142, 245, 246, 127, 247

[56] References Cited

U.S. PATENT DOCUMENTS

| | | | |
|---|---|---|---|
| 4,914,689 | 4/1990 | Quade et al. ............................ | 379/142 |
| 5,228,080 | 7/1993 | Nutter et al. ............................ | 379/373 |
| 5,283,818 | 2/1994 | Klausner et al. ........................ | 379/67 |
| 5,313,515 | 5/1994 | Allen et al. ............................. | 455/413 |
| 5,398,279 | 3/1995 | Frain ...................................... | 379/140 |
| 5,550,909 | 8/1996 | Chanda et al. .......................... | 455/406 |
| 5,703,934 | 12/1997 | Zicker et al. ........................... | 455/462 |
| 5,739,746 | 4/1998 | Shaffer et al. .......................... | 455/403 |
| 5,752,191 | 5/1998 | Fuller et al. ............................ | 455/445 |
| 5,752,195 | 5/1998 | Tsuji et al. .............................. | 455/462 |

FOREIGN PATENT DOCUMENTS

| | | |
|---|---|---|
| 0 498 997 A2 | 8/1992 | European Pat. Off. . |
| 0 699 009 A1 | 2/1996 | European Pat. Off. . |
| 0 715 442 A2 | 6/1996 | European Pat. Off. . |
| 2 287 856 | 9/1995 | United Kingdom . |
| WO 96/06508 | 2/1996 | WIPO . |
| WO 96/25817 | 8/1996 | WIPO . |
| WO 97/23100 | 6/1997 | WIPO . |

*Primary Examiner*—Wellington Chin
*Assistant Examiner*—Keith Ferguson
*Attorney, Agent, or Firm*—Smith & Danamraj, P.C.

[57] ABSTRACT

A system and method in a radio telecommunications network of storing calling line identification (CLI) information when a called mobile terminal is not available to receive the CLI information, and forwarding the CLI information to the called mobile terminal when the terminal becomes available. When an incoming call for the mobile terminal is received in a gateway mobile switching center (G-MSC), the Home Location Register (HLR) or the visited MSC (V-MSC) where the mobile terminal is operating determines whether the mobile terminal is available. If not, the G-MSC sends a short message service (SMS) point-to-point (PTP) message to a message center (MC) and includes the CLI information. The MC is notified when the mobile terminal becomes available. The MC then forwards the CLI information to the V-MSC in a SMS PTP message. The V-MSC sends the CLI information to the mobile terminal in a IS-136 R-DATA message or other appropriate data message.

15 Claims, 4 Drawing Sheets

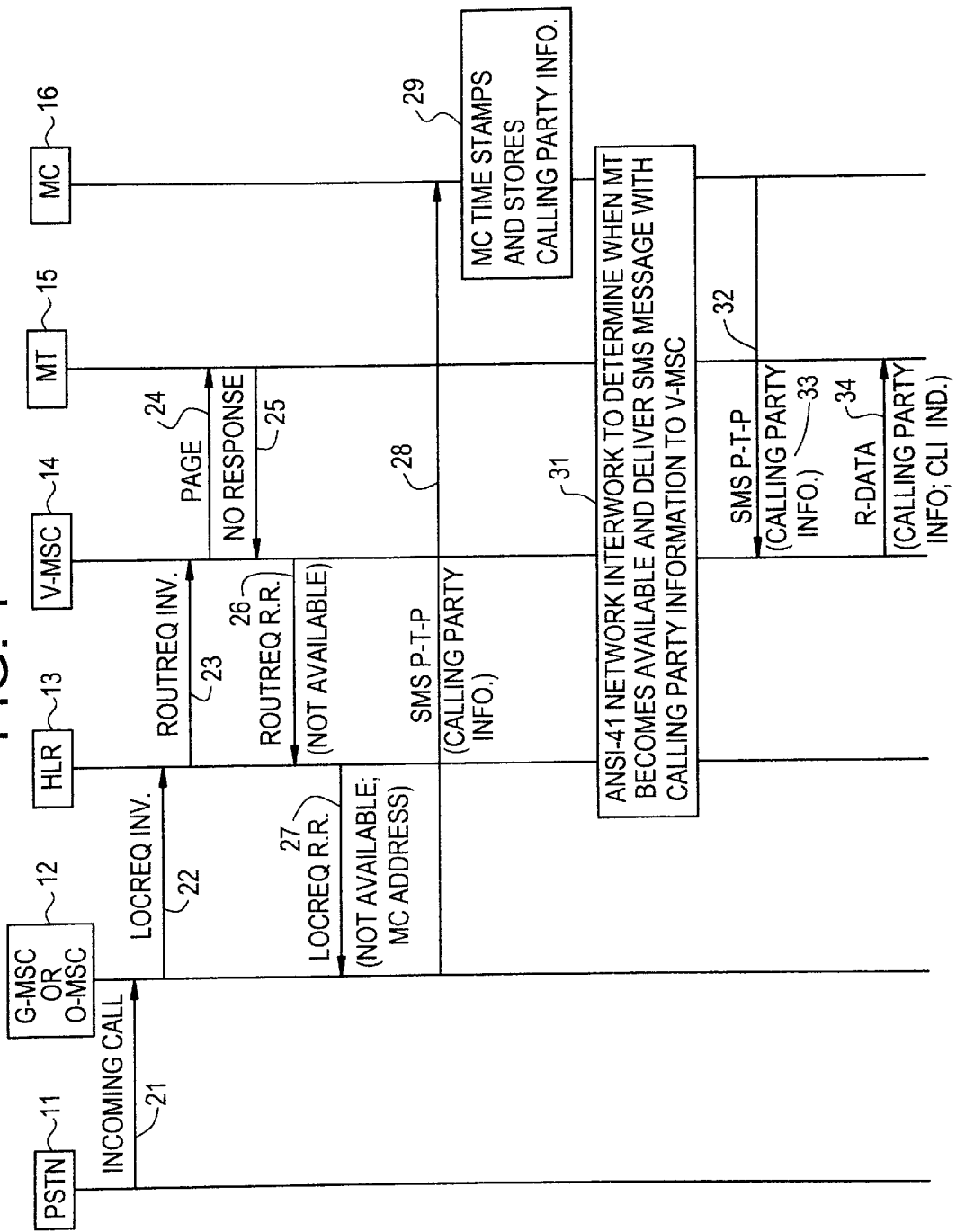

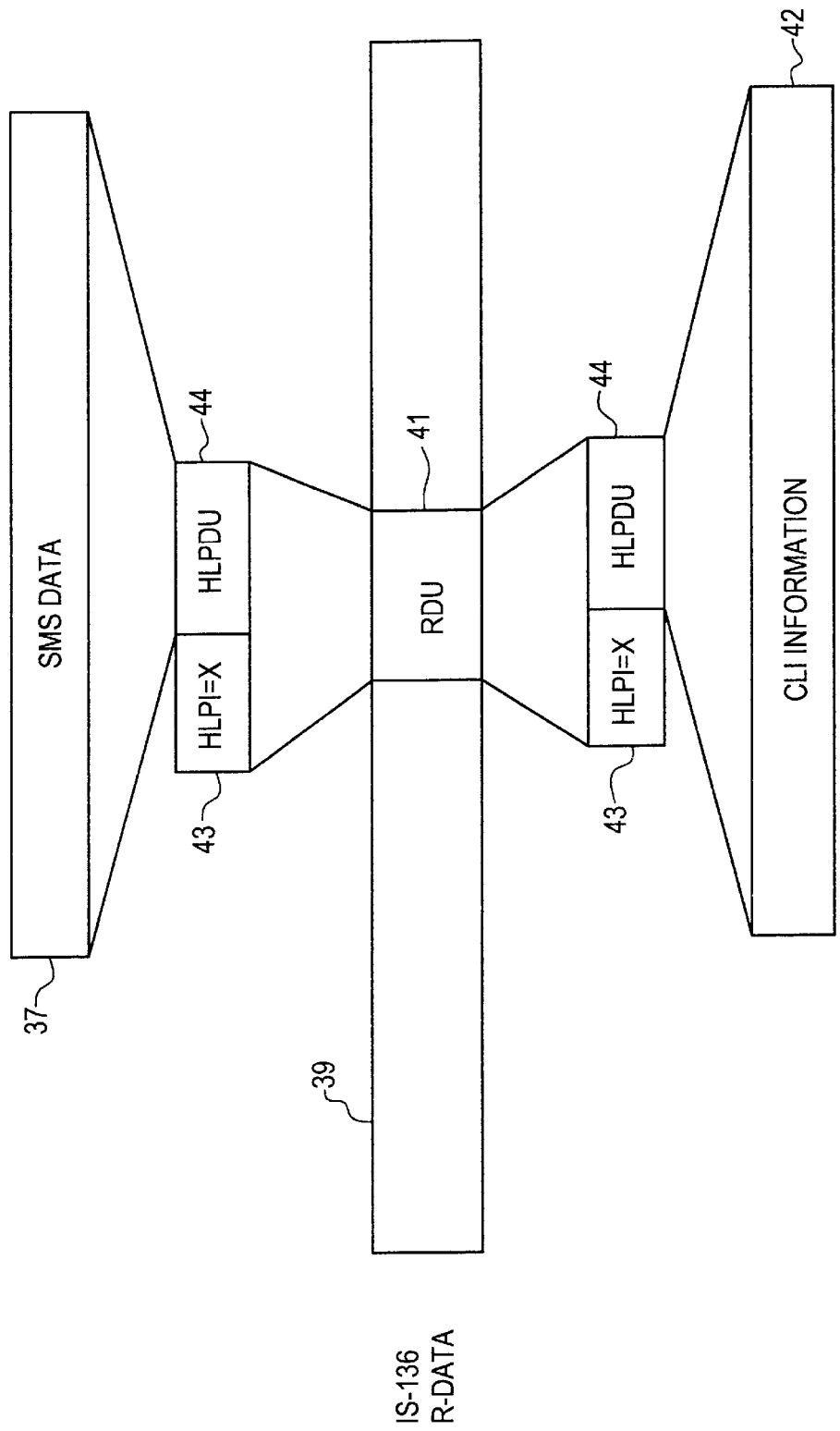

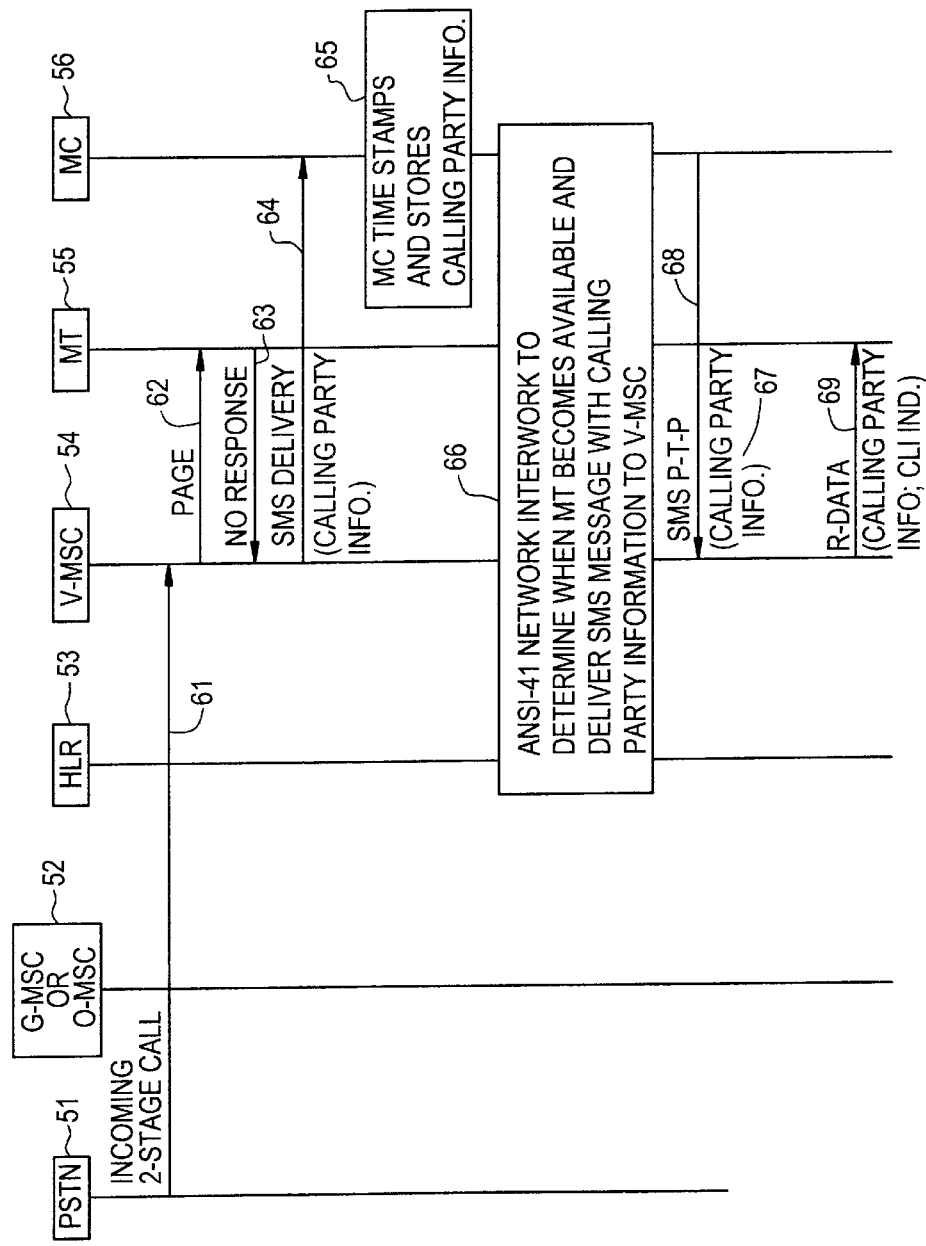

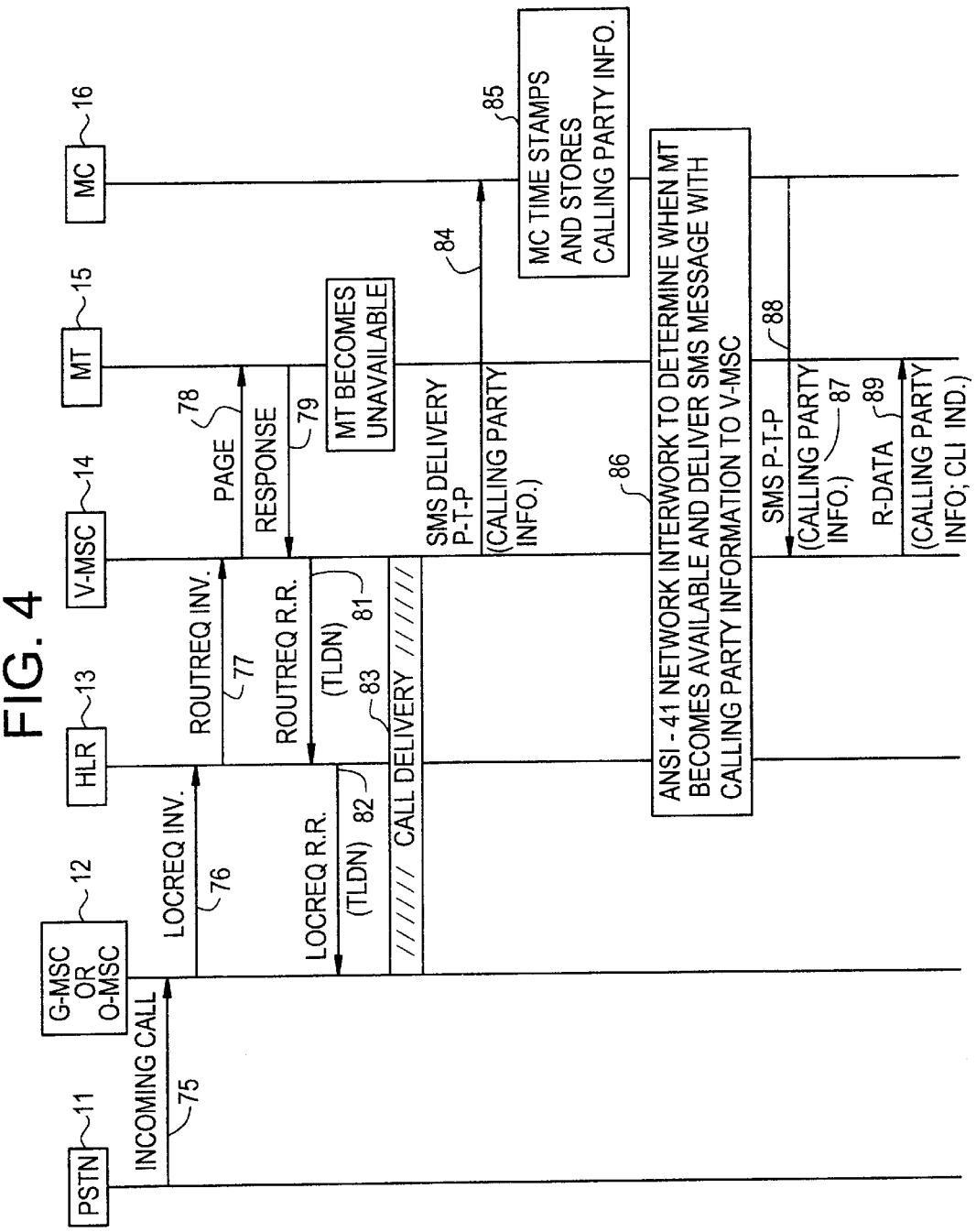

SYSTEM AND METHOD OF PROVIDING CALLING-LINE IDENTIFICATION (CLI) INFORMATION TO A MOBILE TERMINAL IN A RADIO TELECOMMUNICATIONS NETWORK

BACKGROUND OF THE INVENTION

1. Technical Field of the Invention

This invention relates to radio teleconmunications networks and, more particularly, to a system and method of implementing an improved Calling Line Identification (CLI) feature in a radio telecommunications network.

2. Description of Related Art

Calling Line Identification (CLI) is an existing telephone feature which facilitates the display of a calling party's directory number on a called party's terminal display. In the Public Switched Telephone Network (PSTN), when a call is terminated to a called party, the calling party's directory number is sent via line signaling to the called party's terminal. The called party's terminal is equipped with a CLI device which records and displays information regarding the calling party and the calling directory number.

The CLI feature has also been adapted for use in radio telecoimmunications networks. Much like the PSTN version of the feature, in a radio telecommunications network, the calling party's directory number is sent to the called party's mobile terminal during call setup. More particularly, the calling party's directory number is sent to the called party's mobile terminal after a voice channel (or digital traffic channel) has been allocated to the terminal.

The existing CLI feature has disadvantages, however. There are circumstances in radio telecommunications networks that cause the existing feature to fail to record calling party information. For example, mobile terminals may often be unreachable because they are turned off, or the radio resources of the network are congested. In these situations, the CLI feature is unable to display or record the directory numbers of parties that attempted to call during the period that the mobile terminal was turned off or congestion prevented the allocation of a voice channel to the mobile terminal.

Although there are no known prior art teachings of a solution to the aforementioned deficiency and shortcoming such as that disclosed herein, several known references discuss subject matter that bears some relation to matters discussed herein. UK Patent Application GB 2,287,856 discloses a method of relaying calling party identification information to a remote receiver which may be a pager or another telephone. Thus, GB 2,287,856 does not teach or suggest a system or method of storing CLI information while a mobile terminal is inactive or radio channels are congested, and forwarding the stored CLI information to the mobile terminal upon notification that the mobile terminal has been reactivated or at a later time when the congestion has cleared.

U.S. Pat. No. 4,914,689 to Quade et al. (Quade) discloses a reverse number identification system that allows a called subscriber to identify the directory number of the calling party. The Quade reverse number identification system is designed for wireline telephone systems and does not teach or suggest a system or method of storing CLI information while a mobile terminal is inactive or radio channels are congested, and forwarding the stored CLI information to the mobile terminal upon notification that the mobile terminal has been reactivated or at a later time when the congestion has cleared.

U.S. Pat. No. 5,398,279 to Frain (Frain) and European Patent Application EP 0 498 997 A2 each disclose a portable cellular telephone capable of recognizing a CLI signal. The telephone includes a memory for storing telephone numbers and a counter for storing the respective number of calls received from telephone numbers stored in the memory. However, these references do not teach or suggest a system or method of storing CLI information while a mobile terminal is inactive or radio channels are congested, and forwarding the stored CLI information to the mobile terminal upon notification that the mobile terminal has been reactivated or at a later time when the congestion has cleared.

U.S. Pat. No. 5,283,818 to Klausner et al. (Klausner) discloses a telephone answering device (TAD) which includes a means for intelligently organizing voice messages, personal IDs, home telephone numbers, and information stored in the memory of the TAD. Klausner, however, does not teach or suggest a system or method of storing CLI information while a mobile terminal is inactive or radio channels are congested, and forwarding the stored CLI information to the mobile terminal upon notification that the mobile terminal has been reactivated or at a later time when the congestion has cleared.

European Patent Application EP 0 715 442 A2 discloses a method and apparatus for providing personal calling identification at remote locations. A caller from a remote telephone station may enter an alternate directory number as the number to be utilized as the calling number. However, this reference does not teach or suggest a system or method of storing CLI information while a mobile terminal is inactive or radio channels are congested, and forwarding the stored CLI information to the mobile terminal upon notification that the mobile terminal has been reactivated or at a later time when the congestion has cleared.

PCT Patent Application WO 96/06508 discloses a method of identifying a short message originator category in a digital mobile phone network. Thus, this reference discloses a type of calling line identification for short message service (SMS) messages. However, the reference does not teach or suggest a system or method of storing CLI information while a mobile terminal is inactive or radio channels are congested, and forwarding the stored CLI information to the mobile terminal upon notification that the mobile terminal has been reactivated or at a later time when the congestion has cleared.

Review of each of the foregoing references reveals no disclosure or suggestion of a system or method such as that described and claimed herein.

In order to overcome the disadvantage of existing solutions, it would be advantageous to have a system and method of storing CLI information while a mobile terminal is inactive or radio channels are congested, and forwarding the stored CLI information to the mobile terminal upon notification that the mobile terminal has been reactivated or at a later time when the congestion has cleared. The present invention provides such a system and method.

SUMMARY OF THE INVENTION

In one aspect, the present invention is a system for storing CLI information while a mobile terminal is inactive or radio channels are congested, and forwarding the stored CLI information to the mobile terminal upon notification that the mobile terminal has been reactivated or at a later time when the congestion has cleared.

In another aspect, the present invention is a system for providing calling line identification (CLI) information to a called mobile terminal in a radio telecommunications network. The system comprises means for storing the CLI information while the mobile terminal is unavailable to receive the CLI information, means for determining when the mobile terminal is available to receive the CLI information, and means for forwarding the stored CLI information to the mobile terminal upon determining that the mobile terminal is available to receive the CLI information.

In another aspect, the present invention is a method in a radio telecommunications network of storing calling line identification (CLI) information and forwarding the CLI information to a called mobile terminal. The method begins by receiving an incoming call for the mobile terminal in the radio telecommunications network, determining that the mobile terminal is unavailable to receive the incoming call, and storing the CLI information in a message center. This is followed by forwarding the CLI information from the message center to the mobile terminal when the mobile terminal becomes available to receive the CLI information.

In yet another aspect, the present invention is a system in a radio telecommunications network for storing calling line identification (CLI) information and forwarding the CLI information to a called mobile terminal. The system includes a first mobile switching center (MSC) where an incoming call for the mobile terminal enters the radio telecommunications network, the first MSC including means for sending a first data message comprising the CLI information. The system also includes a message center that receives the first data message from the first MSC and stores the CLI information, the message center including means for forwarding the CLI information in a second data message when notified that the mobile terminal has become available to receive the CLI information. A second MSC serves a geographic area in which the mobile terminal is operating, and includes means for determining whether the mobile terminal is available to receive the CLI information, means for receiving the CLI information in the second data message from the message center, and means for sending the CLI information to the mobile terminal in a third data message.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 1 is a message flow diagram illustrating the flow of messages between the nodes of a radio telecommunications network in which the preferred embodiment of the system of the present invention has been implemented;

FIG. 2 is an illustrative drawing illustrating the relationship between Short Message Service (SMS) data carried in a SMS Point-to-Point (PTP) message, an R-Data Unit (RDU) in a R-DATA message, and CLI information utilized in the called mobile terminal;

FIG. 3 is a message flow diagram illustrating the flow of messages between the nodes of a radio telecommunications network in which an alternative embodiment of the present invention has been implemented; and FIG. 4 is a message flow diagram illustrating the flow of messages between the nodes of the radio telecommunications network of FIG. 1 when it is determined after a call is routed that the called mobile terminal is not available.

DETAILED DESCRIPTION OF EMBODIMENTS

FIG. 1 is a message flow diagram illustrating the flow of messages between the nodes of a radio telecommunications network in which the preferred embodiment of the system of the present invention has been implemented. FIG. 1 shows an external network 11 such as the PSTN or an Integrated Service Digital Network (ISDN) connected to a Gateway Mobile Switching Center (G-MSC) 12. For calls originating within the Public Land Mobile Network (PLMN), the G-MSC is referred to as an Originating Mobile Switching Center (O-MSC). A Home Location Register (HLR) 13 stores subscriber profile information, subscriber categories, mobile station activity information, and may include service logic for implementing Intelligent Network (IN) services. A Visited Mobile Switching Center (V-MSC) 14 provides switching and call delivery services to a geographic area in which a mobile terminal (MT) 15 is operating. A Message Center (MC) 16 is a store and forward message center for Short Message Service (SMS) messages.

The preferred embodiment described herein utilizes the ANSI-41 intersystem signaling protocol which is hereby incorporated herein. An incoming call 21 from the PSTN 11 for the MT 15 is received in the G-MSC 12. The G-MSC attempts to locate the called MT by sending a Location Request (LocReq) Invoke message 22 to the called subscriber's HLR 13. If the HLR has information indicating that the mobile station is inactive, the HLR may return a LocReq Return Result message (not shown) to the G-MSC 12 indicating that the mobile station is not available. The HLR ascertains from its internal database that the called subscriber subscribes to the CLI feature and therefore, includes a MC address in the LocReq Return Result message to the G-MSC.

If the HLR does not have information indicating that the mobile station is inactive, the ILR sends a Routing Request (RoutReq) Invoke message 23 to the V-MSC 14 where the MT is operating. The V-MSC pages the MT at 24 and, in the situation shown, receives an indication that the MT 15 is unavailable. By "unavailable", it is meant that there is either no response, the mobile station is inactive, or there is network congestion. The V-MSC 14 then sends a RoutReq Return Result message 26 to the HLR 13 and includes an indication that the MT 15 is not available. The HLR ascertains from its internal database that the called subscriber subscribes to the CLI feature and therefore, includes a MC address in a LocReq Return Result message 27 to the G-MSC 12.

In the preferred embodiment, when a call cannot be delivered to a mobile terminal due to, for example the terminal's inactivity or radio resource congestion, the G-MSC 12 acts as a Short Message Entity (SME). The G-MSC composes a SMS Point-to-Point (P-T-P) message 28 which includes calling party information such as the calling party's directory number, and sends it to the MC 16. The MC time-stamps and stores the calling party information at 29. The MC provides time stamping for each record stored for incoming calls. This enables the calls to be sorted and displayed chronologically to the mobile subscriber. The MC may concatenate the information into a single message.

At 31, network interwork is conducted between network nodes in accordance with known ANSI-41 procedures to determine when the MT becomes available, and to deliver an SMS message from the MC 16 to the V-MSC 14. The interwork may include the sending of MT registration messages, status messages, the setting of SMS indicator flags in the HLR 13, unsuccessful attempts to deliver SMS messages to the MT 15, the setting of SMS indicator flags in the V-MSC when SMS delivery attempts are unsuccessful, etc. The MC then retrieves the stored calling party information and forwards it as SMS data 33 in a SMS P-T-P message 32 to the V-MSC 14. The V-MSC then sends the calling party information to the MT 15 in, for example, a R-DATA message 34. The R-DATA message is utilized in IS-136 Time Division Multiple Access (TDMA) systems. Similar messages for data transmission exist in other standardized systems and fall within the scope of the present invention.

FIG. 2 is an illustrative drawing illustrating the relationship between the SMS data 37 carried in the SMS PTP message 38, an R-Data Unit (RDU) 41 in the R-DATA message 39, and CLI information 42 utilized in the MT 15. The present invention reserves a new value for an existing ANSI-41 parameter called TeleService ID. The TeleService ID parameter is mapped into the IS-136 air interface as a Higher Layer Protocol Identifier (HLPI) 43. The SMS data 37 is placed in a Higher Layer Protocol Data Unit (HLPDU) 44 and appended to the HLPI 43. Together, the HLPI and the HLPDU form the RDU 41 in the IS-136 R-DATA message 39.

Following transmission over the air interface to the MT 15, the RDU 41 is separated once again into the HLPI 43 and the appended HLPDU 44. The HLPI 43 identifies the information in the appended HLPDU 44 as CLI information. The information in the HLPDU 44 is then utilized by the MT 15 as CLI information, and the MT sorts the information chronologically and displays it to the mobile subscriber in the same way that it displays CLI information received in the conventional manner.

FIG. 3 is a message flow diagram illustrating the flow of messages between the nodes of a radio telecommunications network in which an alternative embodiment of the present invention has been implemented. FIG. 3 shows an external network 51 such as the PSTN or ISDN connected to a G-MSC 52. For calls originating within the PLMN, the G-MSC is referred to as an O-MSC. An HLR 53 stores subscriber profile information, subscriber categories, and may include service logic for implementing IN services. A V-MSC 54 provides switching and call delivery services to a geographic area in which a mobile terminal (MT) 55 is operating. A Message Center (MC) 56 is a store and forward message center for SMS messages.

In the embodiment illustrated in FIG. 3, the incoming call for the MT 55 originates in the PSTN 51 through a two-stage dialing mechanism that routes the call directly to the V-MSC 54. The V-MSC pages the MT at 62 and, in the situation shown, receives an indication that the MT 55 is not available. This indication may be obtained by not receiving a response from the MT at 63, or from radio channel congestion preventing the allocation of a voice channel to the MT 55. If the call cannot be delivered at that time, the V-MSC acts as the SME and sends an SMS message 64 to the MC and includes the CLI information.

The SMS message 64 may be sent by the V-MSC 54 as a SMS Deliver message utilizing Global Title Translation (GTT) and the Mobile Identification Number (MIN) of the called MT 55. In this case, the SMS message 64 is sent to a Signal Transfer Point (STP) (not shown) where the message is relayed to the proper message center. Alternatively, the message center address may be added to the mobile subscriber's profile information which is available to the V-MSC 54 in its associated Visitor Location Register (VLR) (not shown).

The MC 56 time-stamps and stores the calling party information at 65. The MC provides time stamping for each record stored for incoming calls. At 66, network interwork is conducted between network nodes in accordance with known ANSI-41 procedures to determine when the MT becomes available, and to deliver an SMS message from the MC 56 to the V-MSC 54. The interwork may include the sending of MT registration messages, status messages, the setting of SMS indicator flags in the HLR 53, unsuccessful attempts to deliver SMS messages to the MT 55, the setting of SMS indicator flags in the V-MSC when SMS delivery attempts are unsuccessful, etc. The MC then retrieves the stored calling party information and forwards it as SMS data 67 in a SMS PTP message 68 to the V-MSC 54. The V-MSC then sends the calling party information to the MT 55 in a R-DATA message 69.

FIG. 4 is a message flow diagram illustrating the flow of messages between the nodes of the radio telecommunications network of FIG. 1 when it is determined after a call is routed that the called mobile terminal is not available. An incoming call 75 from the PSTN 11 for the MT 15 is received in the G-MSC 12. The G-MSC 12 attempts to locate the called MT by sending a LocReq Invoke message 76 to the called subscriber's HLR 13. The HLR sends a RoutReq Invoke message 77 to the V-MSC 14 where the MT is operating. The V-MSC pages the MT at 78 and, in the situation shown, receives a page response 79. The V-MSC then sends a RoutReq Return Result message 81 to the HLR 13 and includes a Temporary Location Directory Number (TLDN) for the MT 15. The HLR sends a LocReq Return Result message 82 to the G-MSC with the TLDN. The G-MSC then delivers the call to the V-MSC at 83.

In systems which utilize "page-before-routing" procedures, however, the MT may become unavailable between the time that the page response 79 and the RoutReq Return Result message are sent, and the call is routed to the V-MSC at 83. In this scenario, "unavailable" means either the MT is inactive, or no voice channel is available due to congestion. Therefore, the V-MSC acts as the SME and sends an SMS message 84 to the MC 16 and includes the CLI information.

As noted above in reference to FIG. 3, the SMS message 84 may be sent by the V-MSC 14 as a SMS Deliver message utilizing Global Title Translation (GTT) and the MIN of the called MT 15. In this case, the SMS message 84 is sent to a STP (not shown) where the message is relayed to the proper message center. Alternatively, the message center address may be added to the mobile subscriber's profile information which is available to the V-MSC 14 in its associated Visitor Location Register (VLR) (not shown).

The MC 16 time-stamps and stores the calling party information at 85. The MC provides time stamping for each record stored for incoming calls. At 86, network interwork is conducted between network nodes in accordance with known ANSI-41 procedures to determine when the MT becomes available, and to deliver an SMS message from the MC 56 to the V-MSC 54. The interwork may include the sending of MT registration messages, status messages, the setting of SMS indicator flags in the HLR 13, unsuccessful attempts to deliver SMS messages to the MT 15, the setting of SMS indicator flags in the V-MSC when SMS delivery attempts are unsuccessful, etc. The MC then retrieves the stored calling party information and forwards it as SMS data 87 in a SMS PTP message 88 to the V-MSC 14. The V-MSC then sends the calling party information to the MT 15 in a R-DATA message 89.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method in a radio telecommunications network of storing calling line identification (CLI) information and forwarding said CLI information to a called mobile terminal, said radio telecommunications network including a serving mobile switching center (MSC) in which said mobile terminal is operating said method comprising the steps of:

receiving an incoming call for said mobile terminal in said radio telecommunications network;

determining by the network, that said mobile terminal is unavailable to receive the incoming call;

storing the CLI information in a network-level message center;

determining by the network, that said mobile terminal has become available to receive the CLI information; and forwarding the CLI information from said message center to said mobile terminal when said mobile terminal becomes available to receive the CLI information, said step of forwarding said CLI information from said message center to said mobile terminal including the steps of:

assigning to a higher layer protocol identifier (HLPI), a value associated with CLI information;

placing said CLI information in a higher layer protocol data unit (HLPDU) appended to said HLPI; and sending said HLPI and said HLPDU in a R-DATA message from said serving MSC to said mobile terminal.

2. The method of storing calling line identification (CLI) information and forwarding said CLI information to a called mobile terminal of claim 1 wherein said step of determining that said mobile terminal is unavailable to receive the incoming call includes determining that said mobile terminal did not respond to a page.

3. The method of storing calling line identification (CLI) information and forwarding said CLI information to a called mobile terminal of claim 1 wherein said step of determining that said mobile terminal is unavailable to receive the incoming call includes determining that a voice channel is not available for said mobile terminal.

4. The method of storing calling line identification (CLI) information and forwarding said CLI information to a called mobile terminal of claim 1 wherein said step of determining that said mobile terminal is unavailable to receive the incoming call includes determining that said mobile terminal is inactive.

5. The method of storing calling line identification (CLI) information and forwarding said CLI information to a called mobile terminal of claim 1 wherein said radio teleconmunications network includes a first mobile switching center (USC) in which said incoming call for said mobile terminal enters said radio telecommunications network, and said method further comprises, after the step of determining that said mobile terminal is unavailable, the steps of:

notifying said first MSC that said mobile terminal is unavailable to receive the incoming call; and sending a first data message comprising said CLI information from said first MSC to said message center.

6. The method of storing calling line identification (CLI) information and forwarding said CLI information to a called mobile terminal of claim 1 wherein said step of storing said CLI information in a message center includes time-stamping said CLI information for each incoming call for said mobile terminal.

7. The method of storing calling line identification (CLI) information and forwarding said CLI information to a called mobile terminal of claim 1 wherein said step of receiving an incoming call for said mobile terminal in said radio telecommunications network includes receiving said call through a two-stage dialing procedure that routes the call directly to a visited mobile switching center (V-MSC).

8. The method of storing calling line identification (CLI) information and forwarding said CLI information to a called mobile terminal of claim 7 wherein said step of storing said CLI information in a message center includes sending a data message comprising said CLI information from said V-MSC to said message center.

9. The method of storing calling line identification (CLI) information and forwarding said CLI information to a called mobile terminal of claim 8 wherein said step of sending a data message comprising said CLI information from said V-MSC to said message center includes sending a short message service (SMS) Delivery message to said message center utilizing Global Title Translation (GTT).

10. A method in a radio telecommunications network of storing calling line identification (CLI) information and forwarding said CLI information to a called mobile terminal, said method comprising the steps of:

receiving an incoming call for said mobile terminal in said radio telecommunications network through a two-stage dialing procedure that routes the call directly to a visited mobile switching center (V-MSC);

determining that said mobile terminal is unavailable to receive the incoming call;

storing the CLI information in a message center by sending a data message comprising said CLI information from said V-MSC to said message center, said step of sending a data message to said message center including the steps of:

including an address for said message center in subscriber profile information associated with said called mobile terminal;

storing said subscriber profile information in a visitor location register (VLR) associated with said V-MSC;

retrieving said message center address from said VLR; and sending a SMS point-to-point (PTP) message from said V-MSC to said message center; and the method further comprising:

determining by the network, that said mobile terminal has become available to receive the CLI information; and forwarding the CLI information from said message center to said mobile terminal when said mobile terminal becomes available to receive the CLI information.

11. A method in a radio telecommunications network of storing calling line identification (CLI) information and forwarding said CLI information to a called mobile terminal, said radio telecommunications network having a first mobile switching center (MSC) in which said incoming call for said mobile terminal enters said network, a second MSC in which said mobile terminal is operating, and a home location register (HLR) that stores subscriber profile information for said mobile terminal, said method comprising the steps of:

receiving an incoming call for said mobile terminal in said radio telecommunications network;

determining that said mobile terminal is not available to receive the incoming call;

notifying said first MSC that said mobile terminal is not available to receive the incoming call;

sending a first data message comprising said CLI information from said first MSC to a network-level message center;

time-stamping and storing said CLI information in the message center;

determining when said mobile terminal becomes available; and forwarding said CLI information from said message center to said mobile terminal through the second MSC said forwarding step including the steps of:
  assigning to a higher layer protocol identifier (HLPI), a value associated with CLI information;
  placing said CLI information in a higher layer protocol data unit (HLPDU) appended to said HLPI; and
  sending said HLPI and said HLPDU in a R-DATA message from said second MSC to said mobile terminal.

12. The method in a radio telecommunications network of storing calling line identification (CLI) information and forwarding said CLI information to a called mobile terminal of claim 11 further comprising the steps of:
  extracting said CLI information from said HLPDU;
  sorting said extacted CLI information chronologically; and
  displaying said sorted CLI information to a subscriber.

13. A system in a radio telecommunications network for storing calling line identification (CLI) information and forwarding said CLI information to a called mobile terminal, said system comprising:
  a first mobile switching center (MSC) where an incoming call for said mobile terminal enters said radio telecommunications network, said first MSC including means for sending a first data message comprising said CLI information;
  a message center that receives said first data message from said first MSC and stores said CLI information, said message center including means for forwarding said CLI information in a second data message when notified that said mobile terminal has become available to receive said CLI information; and
  a second MSC which serves a geographic area in which said mobile terminal is operating, said second MSC including:
    means for determining whether said mobile terminal is available to receive said CLI information;
    means for receiving said CLI information in said second data message from said message center; and
    means for sending said CLI information to said mobile terminal in a third data message by assigning to a higher layer protocol identifier (HLPI), a value associated with CLI information, placing said CLI information in a higher layer protocol data unit (HLPDU) appended to said HLPI and sending said HLPI and said HLPDU in a R-DATA message from said second MSC to said mobile terminal.

14. The system in a radio telecommunications network for storing calling line identification (CLI) information and forwarding said CLI information to a called mobile terminal of claim 13 further comprising:
  a home location register (HLR) which includes:
    a subscriber database;
    service logic;
    means for notifying said first MSC that said mobile terminal is not available to receive said incoming call, and informing said first MSC of an address of said message center; and
    means for sending a fourth data message notifying said message center that said mobile terminal has become available to receive said CLI information.

15. A method in a radio telecommunications network of storing calling line identification (CLI) information and forwarding the CLI information to a called mobile terminal, said radio telecommunications network having a first mobile switching center (MSC) in which an incoming call for the mobile terminal enters the network, a second MSC in which the mobile terminal is operating, and a home location register (HLR) that stores subscriber profile information for the mobile terminal, said method comprising the steps of:
  receiving an incoming call for the mobile terminal in the radio telecommunications network;
  determining by the network that the called mobile terminal is available to receive the call;
  routing the call to the second MSC;
  determining, after the call is routed to the second MSC, that the called mobile terminal is no longer available to receive the incoming call;
  sending a first data message comprising the CLI information from the second MSC to a network-level message center;
  determining when the called mobile terminal becomes available; and
  forwarding the CLI information from the message center to the called mobile terminal through the second MSC.

* * * * *

UNITED STATES PATENT AND TRADEMARK OFFICE
CERTIFICATE OF CORRECTION

PATENT NO. : 6,049,713
DATED : April 11, 2000
INVENTOR(S) : Hung Tran and Donald Joong It is certified that error appears in the above-indentified patent and that said Letters Patent is hereby corrected as shown below:

Column 4, line 32, after "the", delete "ILR" and substitute --HLR-- therefor.
Column 7, line 54, before "in", delete "(USC)" and substitute --(MSC)-- therefor.

Signed and Sealed this

Sixth Day of March, 2001

Attest:

NICHOLAS P. GODICI

Attesting Officer    Acting Director of the United States Patent and Trademark Office